D. W. BAIRD.
Improvement in Hay and Straw Stacking Apparatus.
No. 131,590. Patented Sep. 24, 1872.
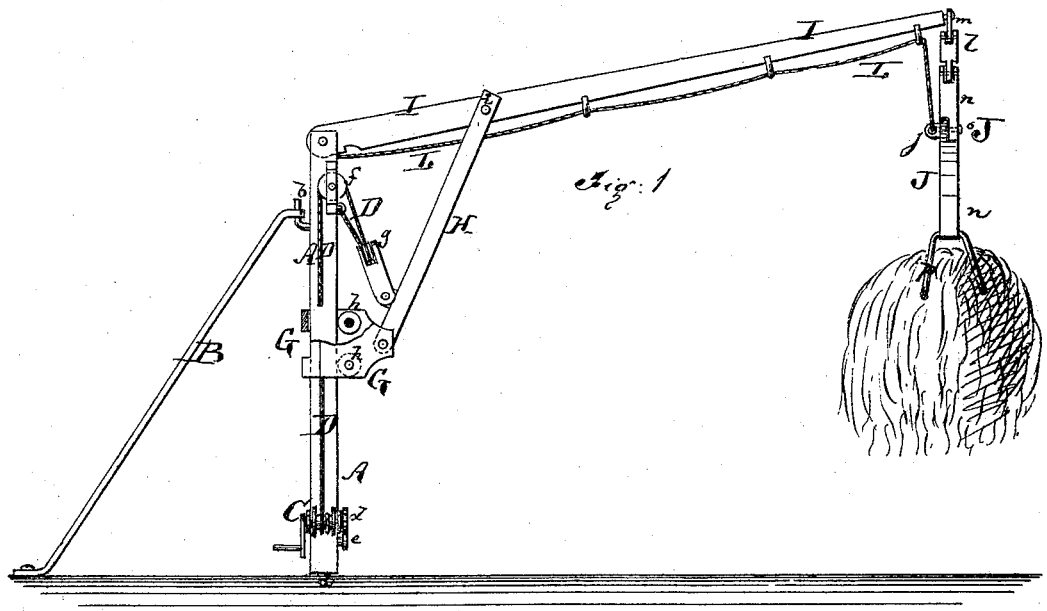
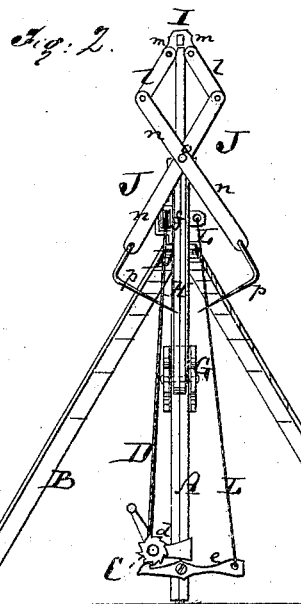
Witnesses:
Chas. Nida
W. A. Graham
Inventor:
D. W. Baird
per [signature]
Attorneys.

UNITED STATES PATENT OFFICE.

DANIEL W. BAIRD, OF LEBANON, TENNESSEE.

IMPROVEMENT IN HAY AND STRAW STACKING APPARATUS.

Specification forming part of Letters Patent No. 131,590, dated September 24, 1872.

*To all whom it may concern:*

Be it known that I, DANIEL W. BAIRD, of Lebanon, in the county of Wilson and State of Tennessee, have invented a new and Improved Hay and Straw Stacking Apparatus, of which the following is a specification:

Figure 1 is a side elevation, partly in section, of my improved stacking apparatus. Fig. 2 is a front elevation of the same.

Similar letters of reference indicate corresponding parts.

This invention relates to a new apparatus for elevating and depositing at a suitable place hay, straw, or other material; and consists in a new windlass mechanism for swinging the hoisting-beam on its pivot, which is done by means of a sliding carriage on the upright, and by a brace extending therefrom to the beam.

A in the drawing is an upright, standing on a pivot, $a$, and held erect by two braces, B B, the upper ends of which are joined together by bolts or otherwise, and fastened to the upright A near the top by a boss, $b$, so as to allow the upright to turn easily on its pivot $a$ and boss $b$. The lower ends of the braces are firmly fastened to the ground by stakes driven through loops at their ends. On the upright A is hung, in projecting ears, a windlass, C, furnished with a ratchet, $d$, and pawl $e$, and carrying the elevating and lowering rope D, which passes over a pulley, $f$, at the upper part of the upright, down around a pulley attached to the carriage G, thence up, and fastened to a staple which projects from the upright near the pulley $f$. The carriage G slides freely up and down the upright, having friction-rollers $h\ h$ to ease the motion, and connects with the lower end of the brace or arm H, the upper end of which is pivoted to the beam I at the point $i$. One end of the beam I is hinged to the top of the upright A, and the other end carries the hay-tongs or grapple J. The cord L is attached to the hay-tongs J at the point J, as shown, passes through a loop on the under side of the beam I, thence along the under side of the beam, and down along the upright to the end of the pawl-lever $e$ that engages the ratchet $d$ on the windlass C. Fig. 2 is intended to show the construction of the hay-tongs J. Two short arms, $l\ l$, having their upper ends pivoted to arms $m$, that project from the sides of the beam I, connect at their lower ends with the upper ends of the longer X-levers $n\ n$. The levers $n\ n$ cross each other, and are joined together by a pivot, $o$, and furnished with tines or forks $p\ p$ at the lower ends, said tines or forks being bent nearly at right angles to the levers $n$ for the purpose of grasping the hay or straw.

A downward pull on the cord L will cause the tongs to open for receiving or discharging the hay, while an upward pull disengages the pawl $e$ from the ratchet $d$ on the windlass C, thus allowing the end of the beam I to descend to the ground. The tongs are then opened, and allowed to come down on the hay or straw, the weight of the beam sinking the tines into it. The cord L is then slackened. By winding the windlass the end of the beam, with its load of straw, is elevated to the desired height, where it is held by the ratchet and pawl, and the machine may be turned around until the load comes over the stack and is discharged by a downward pull on the cord L, as already described.

Having thus described my invention, I claim as new and desire to secure by Letters Patent—

The swivel upright A, carrying the windlass C and sliding carriage G, and combined with the lifting-lever I and brace H, substantially as herein shown and described.

DANIEL W. BAIRD.

Witnesses:
ALEX. W. VICK,
ZAC. TULLIVER, Jr.